(12) United States Patent
Manno

(10) Patent No.: US 6,443,432 B1
(45) Date of Patent: Sep. 3, 2002

(54) STRUCTURES MADE OF CORRUGATED-LIKE PLASTIC & METHOD OF MANUFACTURE AND USE

(76) Inventor: Robert C. Manno, 18601 Demion La. #A, Huntington Beach, CA (US) 92646

( * ) Notice: Subject to any disclaimer, the term of this patent is extended or adjusted under 35 U.S.C. 154(b) by 0 days.

(21) Appl. No.: 09/391,987

(22) Filed: Sep. 9, 1999

(51) Int. Cl.[7] ................................................ B32B 3/28
(52) U.S. Cl. .............................. 256/19; 256/1; 52/660; 47/33
(58) Field of Search ........................ 206/24–26, 12.5, 206/19, 22, 1; 135/87, 900; 160/135; 49/33; 52/102, 660, 664; D25/38, 42

(56) References Cited

U.S. PATENT DOCUMENTS

| | | | | |
|---|---|---|---|---|
| 3,559,518 A | * | 2/1971 | Domka ........................ 83/124 |
| 3,741,857 A | * | 6/1973 | Kakutani et al. ........... 428/178 |
| 3,755,054 A | * | 8/1973 | Medney .................... 256/24 X |
| 3,866,523 A | * | 2/1975 | Geschwender ............... 493/18 |
| 4,647,491 A | * | 3/1987 | Ireland et al. .............. 428/137 |
| 4,838,525 A | * | 6/1989 | Snow et al. .................. 256/26 |
| 4,928,415 A | * | 5/1990 | Walters ........................ 40/610 |
| 5,007,473 A | * | 4/1991 | Evensen ..................... 160/135 |
| 5,078,367 A | * | 1/1992 | Simpson et al. ............... 256/24 |
| D338,072 S | * | 8/1993 | Nozicka ....................... D25/38 |
| 5,265,848 A | * | 11/1993 | Michaud et al. .............. 256/26 |
| 5,294,044 A | * | 3/1994 | Clark .......................... 229/191 |
| 5,502,930 A | * | 4/1996 | Burkette et al. ........ 160/135 X |
| 5,520,477 A | * | 5/1996 | Fink ........................... 403/397 |
| D374,485 S | * | 10/1996 | Brown ......................... D25/38 |
| 5,570,735 A | * | 11/1996 | Chu ........................ 160/135 X |
| 5,661,944 A | * | 9/1997 | Specht ....................... 52/656.8 |
| 5,873,517 A | * | 2/1999 | Lisbon .................... 229/198.2 |

* cited by examiner

Primary Examiner—Lynne H. Browne
Assistant Examiner—John R. Cottingham
(74) Attorney, Agent, or Firm—John J. Connors; Connors & Associates, Inc.

(57) ABSTRACT

Fences and lattices are formed from a single sheet of corrugated-like plastic material comprising a pair of substantially flat sheets spaced apart by spacers that are in parallel and have the same width to form between the flat sheet a series of parallel channels. The fences include a pair of spaced apart cross supports and a series of pickets that intersect the cross supports. The cross supports and pickets all lie in substantially the same plane. The lattices include a plurality of slats intersecting each other at an angle of 90°. These slats all lie in substantially the same plane and the channels are at an angle of 45° with respect to the longitudinal axis of individual slats.

19 Claims, 6 Drawing Sheets

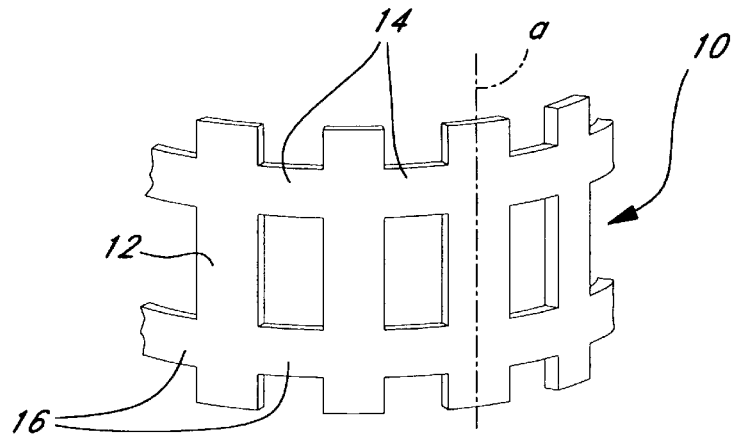
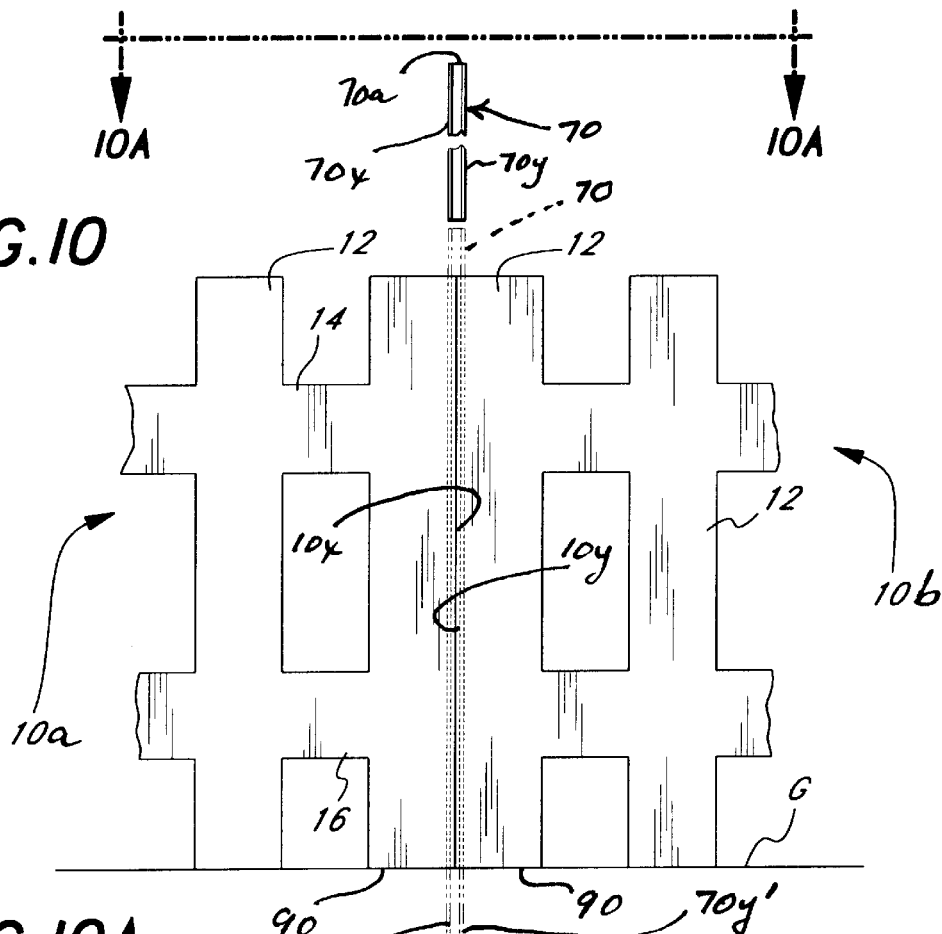
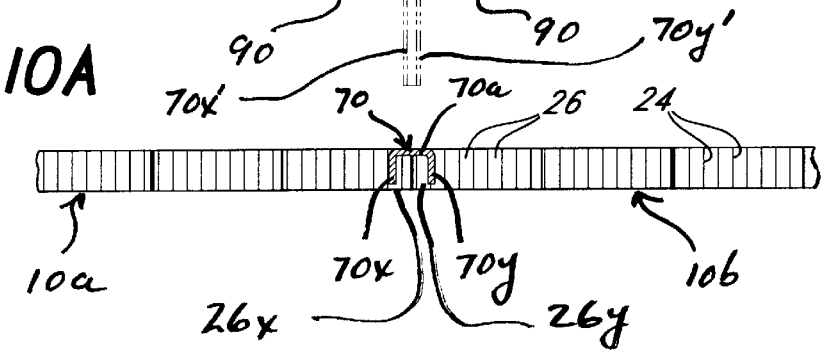

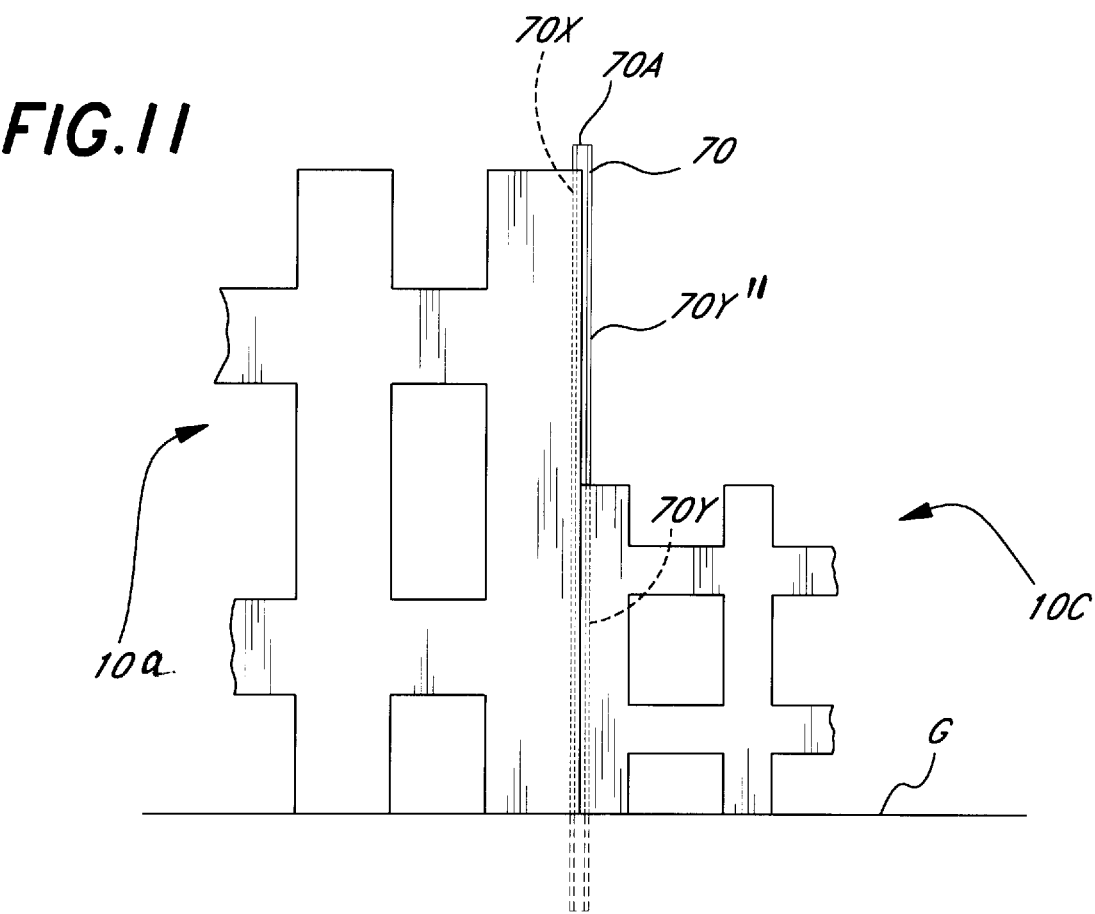

STRUCTURES MADE OF CORRUGATED-LIKE PLASTIC & METHOD OF MANUFACTURE AND USE

BACKGROUND OF THE INVENTION

It is common place for fences and lattices to be made of wooden boards or slats that are nailed together. This is an expensive procedure and fences or lattices made from wood do not lend themselves to be mass-produced. Moreover, to alter their height or width, for example, the wooden boards must be cut with a saw, which for some individuals is a difficult and inconvenient task. To color the fences or lattices, the wooden boards must be painted.

SUMMARY OF THE INVENTION

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, low cost manufacture, ease of installation and use, durability, elimination of painting, and flexibility.

The first feature of the structure of this invention is that it has intersecting strips that all lie in the same plane and wherein the structure is made from a sheet of corrugated-like plastic material by die cutting this sheet. The structure may, for example, be a fence or a lattice.

The second feature is that, when the structure is a fence, it comprises a pair of spaced apart cross supports and a series of pickets that intersect the cross supports at an angle of about 90°. The cross supports and pickets all lie in substantially the same plane and are formed from a single sheet of the corrugated-like plastic material.

The third feature is that, when the structure is a lattice, it comprises a plurality of slats intersecting each other at an angle of about 90°. The slats lie in substantially the same plane and are formed from a single sheet of the corrugated-like plastic material.

The fourth feature is that the sheet of corrugated-like plastic material comprises a pair of substantially flat members spaced apart by spacers. The flat members have a thickness of from about 1/64 to about 1/32 inch. The spacers are also thin having have a thickness of from about 1/64 to about 1/32 inch. They are in parallel and they all have the same width to form between the flat members a series of parallel channels. The width of the spacers is from about 1/8 to about 3/8 inch and they are separated by a distance of from about 1/8 to about 1/4 inch. In the fence, the parallel channels extend lengthwise along the length of the pickets. In the lattice, the channels are at an angle of 45° with respect to the longitudinal axis of individual slats. The corrugated-like plastic material typically has a, sheet thickness of from about 1/8 to about 3/8 inch, and an area of from about 4 to about 24 square feet. A suitable sheet material is sold under the trademark Coroplast™, manufactured by OS Plastics of Fullerton, Calif. It is polypropylene-based copolymer and it comes in several different colors. Therefore does not need to be painted. It is durable, lightweight, reusable, and weather-resistant. It may also be easily flexed or bent along the channels to form curved structures. Ordinarily, it is not bent across the spacers or channels, because this would permanently deform the material.

This invention also includes a method of manufacturing a structure such as a fence or lattice. The method of making a fence comprises cutting a single sheet of corrugated-like plastic material to form from the sheet a pair of cross supports and intersecting pickets that are in the same plane. The method of making a lattice comprises cutting a single sheet of corrugated-like plastic material to form intersecting slats that are in the same plane.

This invention also includes a method of constructing a fence by (a) providing at least two fence sections where each fence section comprises a plurality of slats intersecting each other, said slats lying in substantially the same plane and being formed from a single sheet of corrugated-like plastic material where the corrugated-like plastic material comprises a pair of substantially flat members spaced apart by spacers that are in parallel to form between the flat members a series of parallel channels, each fence section having side edges, (b) positioning the two fence sections next to each other with their respective side edges abutting each other and the fence sections oriented substantially at a right angle to ground level, and (c) providing a connector that has a pair of parallel legs and inserting one leg into a channel in each fence section.

In this method the connector is U-shaped, and preferably the connector legs are substantially longer than the height of the fence sections. Preferably, legs have lower ends that are forced into the ground after passing through the channels. The fence sections preferably are of equal height.

DESCRIPTION OF THE DRAWING

The preferred embodiments of this invention, illustrating all its features, will now be discussed in detail. These embodiments depict the novel and non-obvious structures of this invention and manufacturing methods and use thereof as shown in the accompanying drawing, which is for illustrative purposes only. This drawing includes the following figures (FIGS.), with like numerals indicating like parts:

FIG. 9 is a perspective view of the fence shown in FIG. 1 bent about a line that is parallel to the channels of the sheet material.

FIG. 10 is a front elevational view showing a U-shaped connector being pushed into adjacent channels of adjacent fence sections of this invention.

FIG. 10A is a plan view taken along line 10A—10A of FIG. 10.

FIG. 11 is a front elevational view showing the U-shaped connector being pushed into adjacent channels of the fence sections of different heights.

DETAILED DESCRIPTION OF THE PREFERRED EMBODIMENTS

Figure 1:
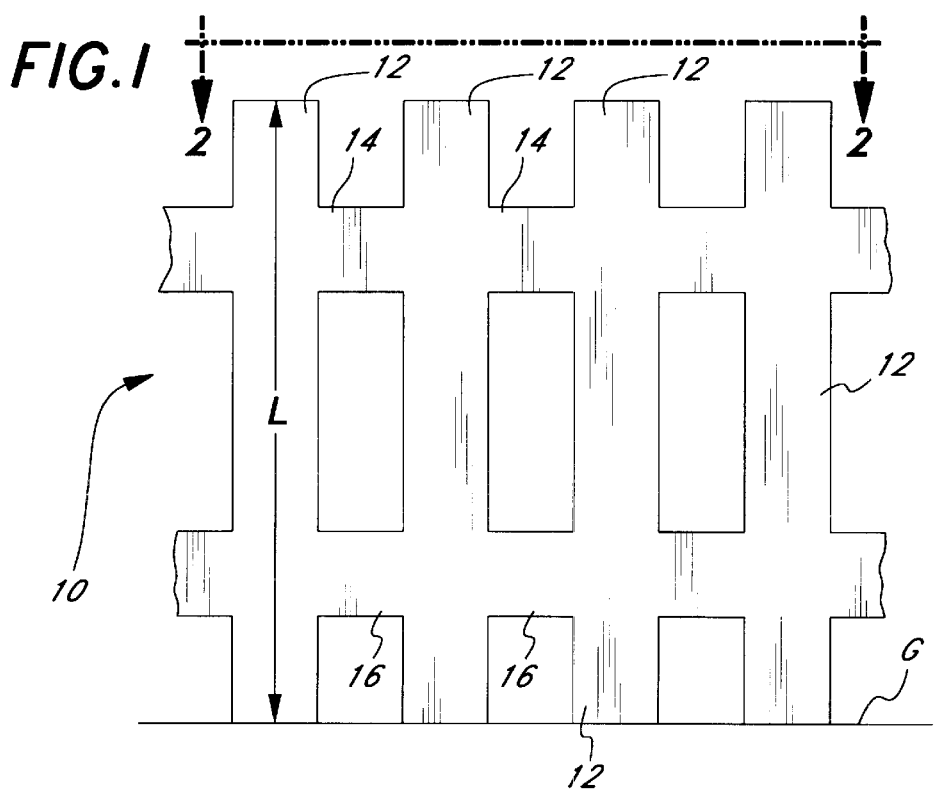
FIG. 1 is a front elevational view showing the fence of this invention.
Figure 2:
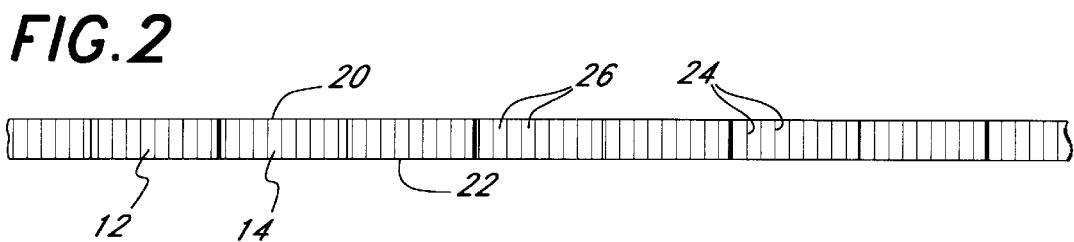
FIG. 2 is a plan view taken along line 2—2 of FIG. 1.
Figure 2A:
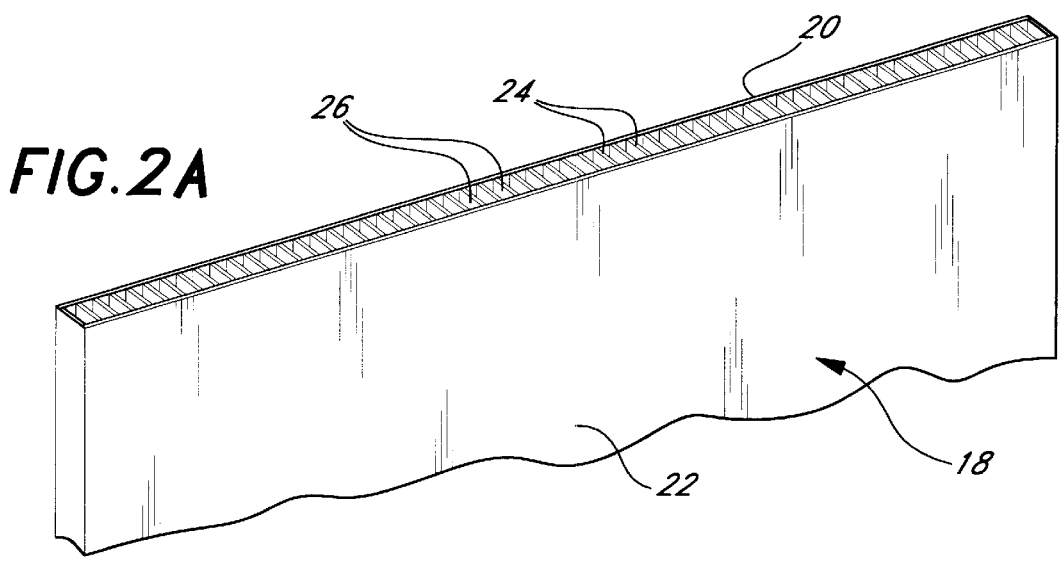
FIG. 2A is a fragmentary perspective view of the corrugated-like plastic sheet material from which the fences and lattices of this invention are made.

As depicted in FIGS. 1, 2 and 2A, the fence 10 of this invention comprises a series of parallel pickets 12 intersecting a pair of parallel cross supports 14 and 16 at an angle of about 90°. In accordance with this invention, the fence is cut from a sheet 18 of corrugated-like plastic material using a rule-type die 19 shown in FIG. 5. The corrugated-like plastic sheet 18 comprises a pair of parallel, thin substantially flat members 20 and 22 spaced apart by thin spacers 24. The spacers 24 are in parallel and each have the same width of about ⅛ inch to form between the flat members a series of parallel channels 26. A distance of about ⅜ inch separates the spacers 24. The cross supports 14 have a width of from about 1½ to about 4 inches, and they are separated a distance of from about ½ to about 5 feet. The pickets 12 have a width of from about 1½ to about 4 inches, and they are separated a distance of from about 1½ to about 4 inches.

As depicted in FIGS. 10 and 10A, two or more fence sections 10a and 10b are connected together end to end along their adjacent side edges using a U-shaped connector 70. This U-shaped connector comprises a bite 70a connecting a pair of parallel legs 70x and 70y of substantially the same length which is from about 4 to 8 inches longer than the height of the fence sections 10a and 10b. First, the left hand edge 10x of the fence section 10a is positioned to abut the right hand edge 10y of the fence section 10b, with the lower edges 90 of the fence sections resting on the ground G. Then, simultaneously the legs 70x and 70y are pushed into the channels 26x and 26y respectively along the left hand edge 10x and the right hand edge 10y until the lower ends 70x' and 70y' are forced into the ground G.

As depicted in FIG. 11, the fence 10 may be formed by connecting two sections 10a and 10c of different heights with the U-shaped connector 70 as discussed above. In this case, however, the upper portion 70y" of the one leg 70y is partially exposed. The U-shaped connector 70 preferably is the same color as the fence sections 10a and 10c so that this exposed portion 70y" is not obtrusive.

As shown in FIG. 9, the fence 10 may easily be bent about a line a that is parallel to the channels 26. Upon moving the fence 10 shown in FIG. 9 to another location, this fence 10 may straightened and returned to its normally flat or straight condition.

Figure 5:
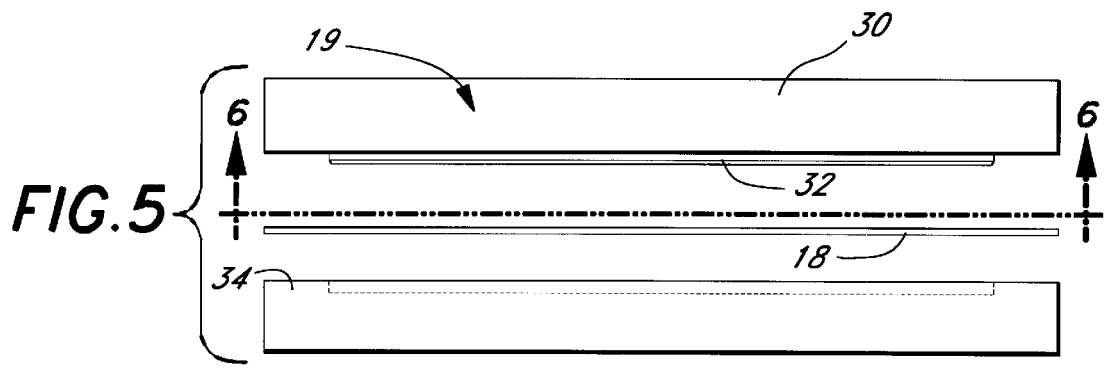
FIG. 5 is a side elevational view of a sheet of corrugated-like plastic being cut with a die to form the fence of this invention.
Figure 6:
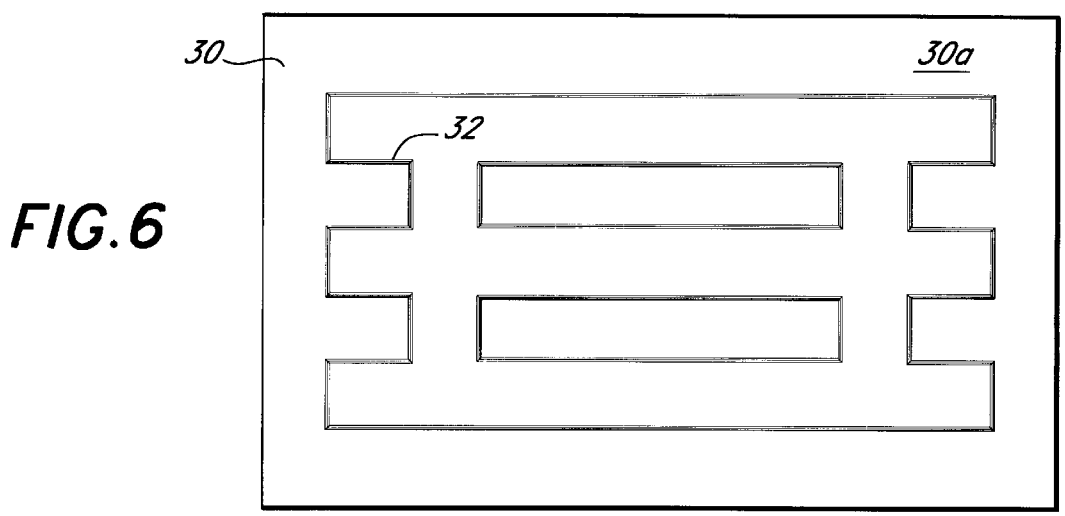
FIG. 6 is a cross-sectional view taken along line 6—6 of FIG. 5 showing the configuration of the rule-type die used to cut the fence from the sheet material.
Figure 6A:
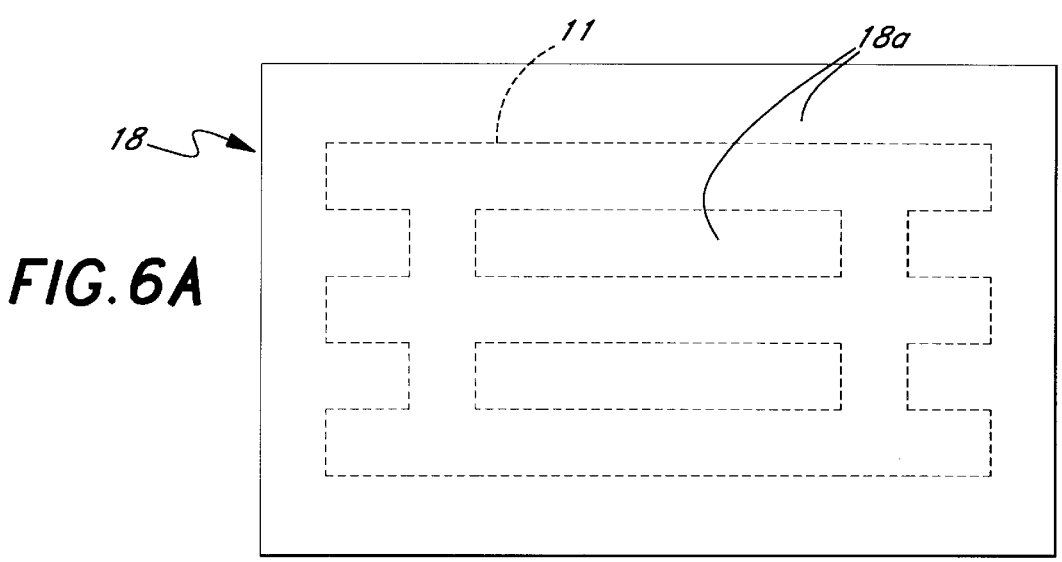
FIG. 6A is a plan view showing the sheet immediately after being cut to make a fence and before marginal and waste material is removed.

Because the fence 10 is made from a single sheet 18, the pickets 12 and cross supports 14 and 16 lie in the same plane, that is, they are in the plane of the sheet 18. In conventional fences, the wooden pickets overlap the wooden cross supports, and consequently, are not in the same plane. As shown in FIGS. 5 and 6, the rule-type die 19 has an upper plate 30 having on its inside surface 30a. (FIG. 6) a steel rule or blade 32 bent into the configuration of the fence 10 as shown in FIG. 6. Underneath the upper plate 30 is an anvil plate 34. Initially, the sheet 18 is placed between the upper plate 30 and the anvil plate 34, and then a press (not shown) pushes the plates together. As these plates 30 and 34 engage, the blade 32 cuts through the sheet 18 to form a cut 11 (dotted lines) that is an outline of the fence 10. As illustrated in FIG. 6A, after cutting the sheet with the die 19, the marginal and internal waste material 18a is removed from the sheet 18. Preferably, the parallel channels 26 extend lengthwise along the length L of the pickets 12.

Figure 3:
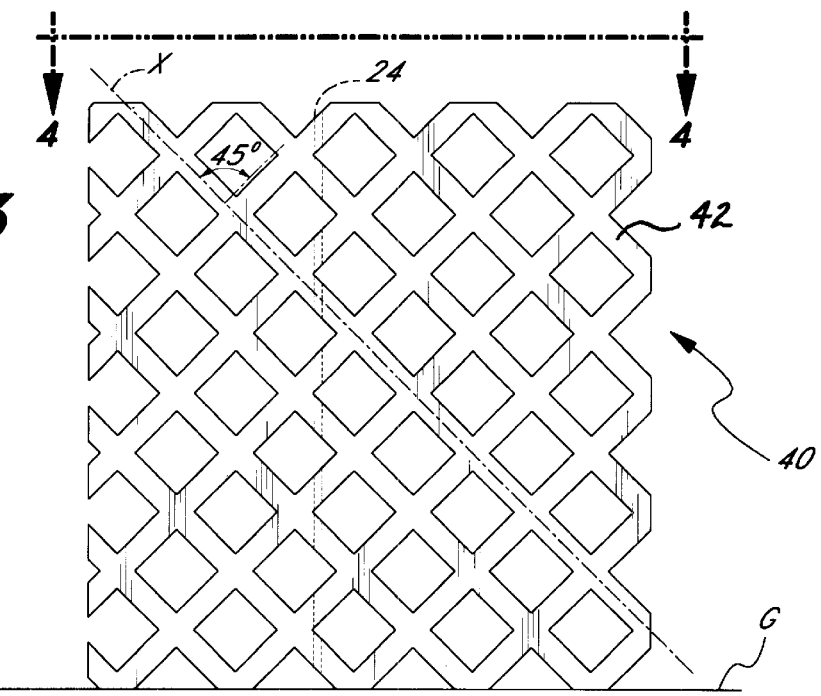
FIG. 3 is a front elevational view showing the lattice of this invention.
Figure 4:
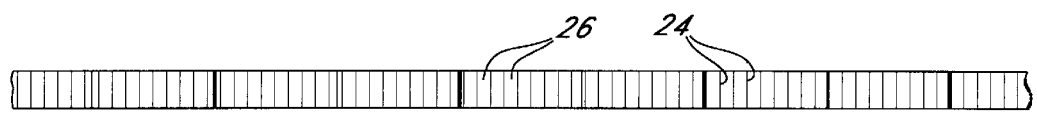
FIG. 4 is a plan view taken along line 4—4 of FIG. 3.
Figure 4A:
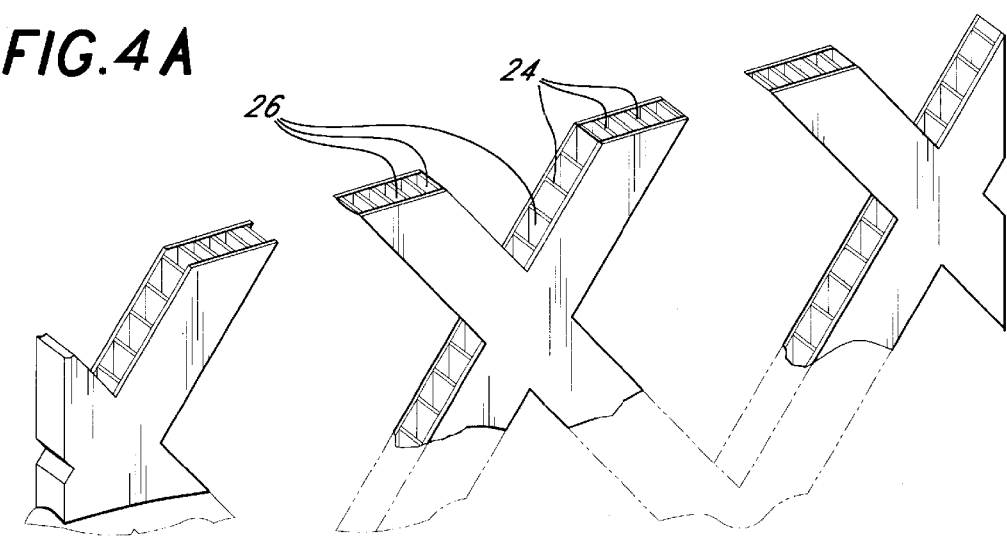
FIG. 4A is a fragmentary perspective view of the lattice of this invention.

As depicted in FIGS. 3 and 4, the lattice 40 of this invention comprises a plurality of spaced apart, intersecting slats 42. The same type of corrugated-like plastic sheet 18 as discussed about is used to make the lattice 40. The slats 42 intersect each other at an angle of about 90°, and the channels 26 in the sheet 18 are at an angle of 45° with respect to the longitudinal axis x of individual slats. The slats 42 have a width of from about ¾ to about 2 inches, and they are separated a distance of from about 1 to about 4 inches.

Figure 7:
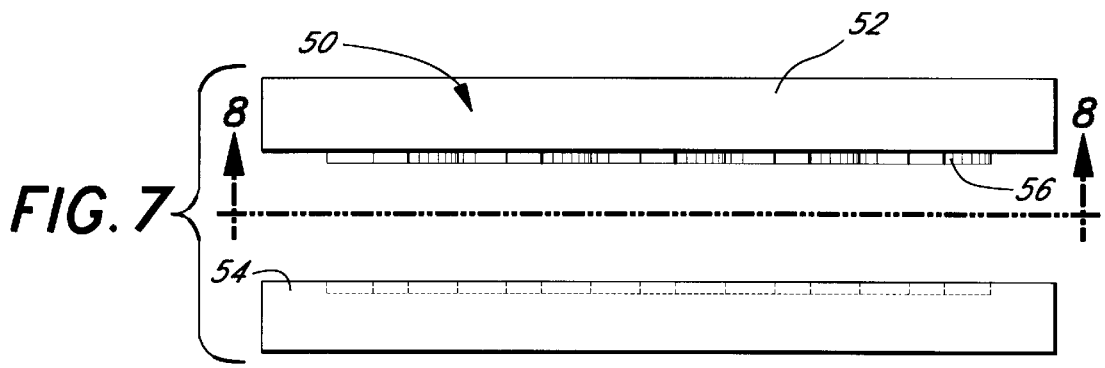
FIG. 7 is a side elevational view of a sheet of corrugated-like plastic being cut with a die to form the lattice of this invention.
Figure 8:
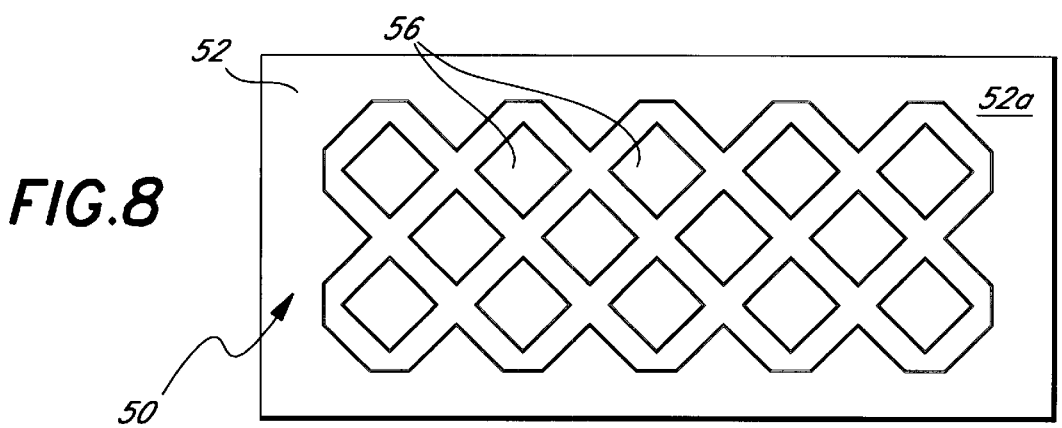
FIG. 8 is a cross-sectional view taken along line 8—8 of FIG. 7 showing the configuration of the rule-type die used to cut the lattice from the sheet material.
Figure 8A:
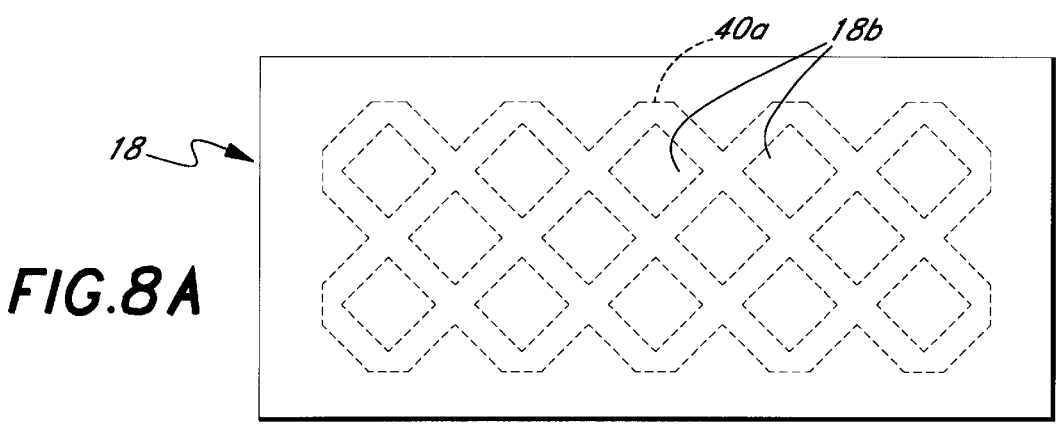
FIG. 8A is a plan view showing the sheet immediately after being cut to make a lattice and before marginal and waste material is removed.

In accordance with this invention, the lattice 40 is cut from the sheet 18 of corrugated-like plastic material using a rule-type die 50 shown in FIG. 7. Because the lattice 40 is made from a single sheet 18, the slats 42 all lie in the same plane, that is, they are in the plane of the sheet 18. In conventional lattices, the wooden slats overlap, and consequently, are not in the same plane. As shown in FIGS. 7 and 8, the rule-type die 50 has an upper plate 52 having on its inside surface 52a (FIG. 8) a steel rule or blade 56 bent into the configuration of the lattice 50 as shown in FIG. 8. Underneath the upper plate 52 is an anvil plate 54. Initially, the sheet 18 is placed between the upper plate 50 and the anvil plate 54, and then a press (not shown) pushes the plates together. As these plates 52 and 54 engage, the blade 56 cuts through the sheet 18 to form a cut 40a that is an outline of the lattice 40. As illustrated in FIG. 8A, after cutting the sheet 18 with the die 50, the marginal and internal waste material 18b is removed from the sheet 18. Although the rule-type die 50 is illustrated, a roller type die could also be used to cut the sheet 18.

The fences and lattices of this invention may be made in different colors by simply using the desired colored sheet 18. They may be of different sizes, and have different thickness based on the thickness of the sheet 18. And because they are made from the sheet 18, they may be shortened or shaped by cutting with a conventional scissors rather than a saw. The main difference between the fence 10 and the lattice 40 is the manner of orienting them with respect to ground G. With the fence 10, the cross supports 14 and 16 are horizontal and substantially parallel to ground G and the pickets are at a right angle to ground. With the lattice 40, the slats 42 are at an angle of 45° with respect to the ground G.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A fence comprising a pair of spaced apart cross supports and a series of pickets that intersect said cross supports, said cross supports and pickets lying in substantially the same plane and being formed from a single sheet of substantially corrugated plastic material.

2. The fence of claim 1 where the sheet of substantially corrugated plastic material comprises a pair of substantially flat members spaced apart by spacers that are in parallel and have the same width to form between the flat members a series of parallel channels.

3. The fence of claim 2 where the parallel channels extend lengthwise along the length of the pickets.

4. The fence of claim 1 where the cross supports and pickets are formed by die cutting the sheet of corrugated-like plastic material.

5. The fence of claim 1 where the sheet of substantially corrugated plastic material has a thickness of from $1/8$ to $3/8$ inch.

6. The fence of claim 1 where the cross supports and pickets intersect each other at an angle of 90°, and the pickets are at an angle of 90° with respect to ground level.

7. A lattice comprising a plurality of slats intersecting each other, said slats lying in substantially the same plane and being formed from a single sheet of substantially corrugated plastic material.

8. The lattice of claim 7 where the sheet of corrugated-like plastic material comprises a pair of substantially flat members spaced apart by spacers that are in parallel and have the same width to form between the flat members a series of parallel channels.

9. The lattice of claim 8 where the slats intersect each other at an angle of 90°, the channels are at an angle of 45° with respect to the longitudinal axis of individual slats, and the slats are at an angle of 45° with respect to ground level.

10. The lattice of claim 7 where the slats are formed by die cutting the sheet of substantially corrugated plastic material.

11. The lattice of claim 7 where the sheet of substantially corrugated plastic material has a thickness of from $1/8$ to $3/8$ inch.

12. A structure having intersecting strips in substantially the same plane and wherein the structure is made from a single sheet of substantially corrugated plastic material comprising a pair of substantially flat members spaced apart by spacers that are in parallel and have the same width to form between the flat members a series of parallel channels, said strips being formed by cutting the sheet using a rule-type die.

13. A method of making a fence comprising the steps of cutting a single sheet of substantially corrugated plastic material to form from the sheet a pair of cross supports and intersecting pickets that are in the same plane and where the cross supports and pickets intersect each other at an angle of 90°, and the pickets are at an angle of 90° with respect to ground level.

14. A method of making a lattice comprising cutting a single sheet of substantially corrugated plastic material to form intersecting slats that are in the same plane and where the slats intersect each other at an angle of 90°, and are at an angle of 45° with respect to ground level.

15. A method of constructing a fence including the steps of providing at least two fence sections where each fence section comprises a plurality of slats intersecting each other, said slats lying in substantially the same plane and being formed from a single sheet of substantially corrugated plastic material where the substantially corrugated plastic material comprises a pair of substantially flat members spaced apart by spacers that are in parallel to form between the flat members a series of parallel channels, each fence section having side edges, positioning the two fence sections next to each other with their respective side edges abutting each other and the fence sections oriented substantially at a right angle to ground level, and providing a connector that has a pair of parallel legs and inserting one leg into a channel in each fence section.

16. The method of claim 15 where the connector is U-shaped.

17. The method of claim 15 where the connector legs are substantially longer than the height of the fence sections and legs have lower ends which are forced into the ground after passing through the channels.

18. The method of claim 16 where the fence sections are of equal height.

19. A method of making a structure having intersecting strips comprising the step of (a) providing a single sheet substantially corrugated plastic material comprising a pair of substantially flat members spaced apart by spacers that are in parallel and have the same width to form between the flat members a series of parallel channels, and (b) with a rule-type die cutting the single sheet of substantially corrugated plastic material to form therein strips that are in substantially the same plane.

* * * * *